United States Patent [19]
Cui et al.

[11] Patent Number: 5,529,368
[45] Date of Patent: Jun. 25, 1996

[54] UMBRELLA UNIT ATTACHABLE TO A VEHICLE

[76] Inventors: Kan Cui; Yan Liu, both of 5801 Altama Ave., 5E, Brunswick, Ga. 31525

[21] Appl. No.: 404,066

[22] Filed: Mar. 14, 1995

[51] Int. Cl.⁶ .................................................... A45B 3/00
[52] U.S. Cl. ...................... 296/99.1; 296/152; 135/16; 135/20.3; 135/22
[58] Field of Search ................... 296/99.1, 152; 135/16, 20.3, 22, 34.2, 88

[56] References Cited

U.S. PATENT DOCUMENTS

| | | | |
|---|---|---|---|
| D. 350,527 | 9/1994 | Parlor, Sr. | |
| 2,426,113 | 8/1947 | Northcutt. | |
| 4,543,971 | 10/1985 | Sirota | 135/16 |
| 4,562,849 | 1/1986 | Sirota | 135/16 |
| 4,807,920 | 2/1989 | Fujiki et al. | 296/37.8 |
| 5,150,728 | 9/1992 | Stark | 135/16 |
| 5,188,331 | 2/1993 | Baines | 135/16 X |

FOREIGN PATENT DOCUMENTS

| | | | |
|---|---|---|---|
| 237718 | 1/1960 | Australia. | |
| 3509120 | 9/1986 | Germany. | |
| 4211530 | 10/1993 | Germany. | |
| 56-50812 | 10/1979 | Japan. | |
| 53277 | 3/1984 | Japan | 296/99.1 |
| 2202141 | 9/1988 | United Kingdom. | |
| 9103384 | 3/1991 | WIPO | 296/152 |

*Primary Examiner*—Joseph D. Pape
*Attorney, Agent, or Firm*—Richard C. Litman

[57] ABSTRACT

An umbrella unit attachable to vehicles has a conventional umbrella and an umbrella-deploying and retracting device which can be attached to a vehicle, thereby protecting passengers and a car's interior from rain. Attachment can occur at a side-door or on a roof of a vehicle. The umbrella-deploying and retracting device has closable doors to protect and conceal the umbrella and umbrella-deploying and retracting device when the umbrella is not in use. The umbrella-deploying and retracting device also has a control mechanism which controls umbrella-deployment and umbrella-storage via pulleys and a spring. The umbrella can easily be attached to and subsequently separated from the umbrella-deploying and retracting device, to allow use of the umbrella away from the vehicle.

20 Claims, 4 Drawing Sheets

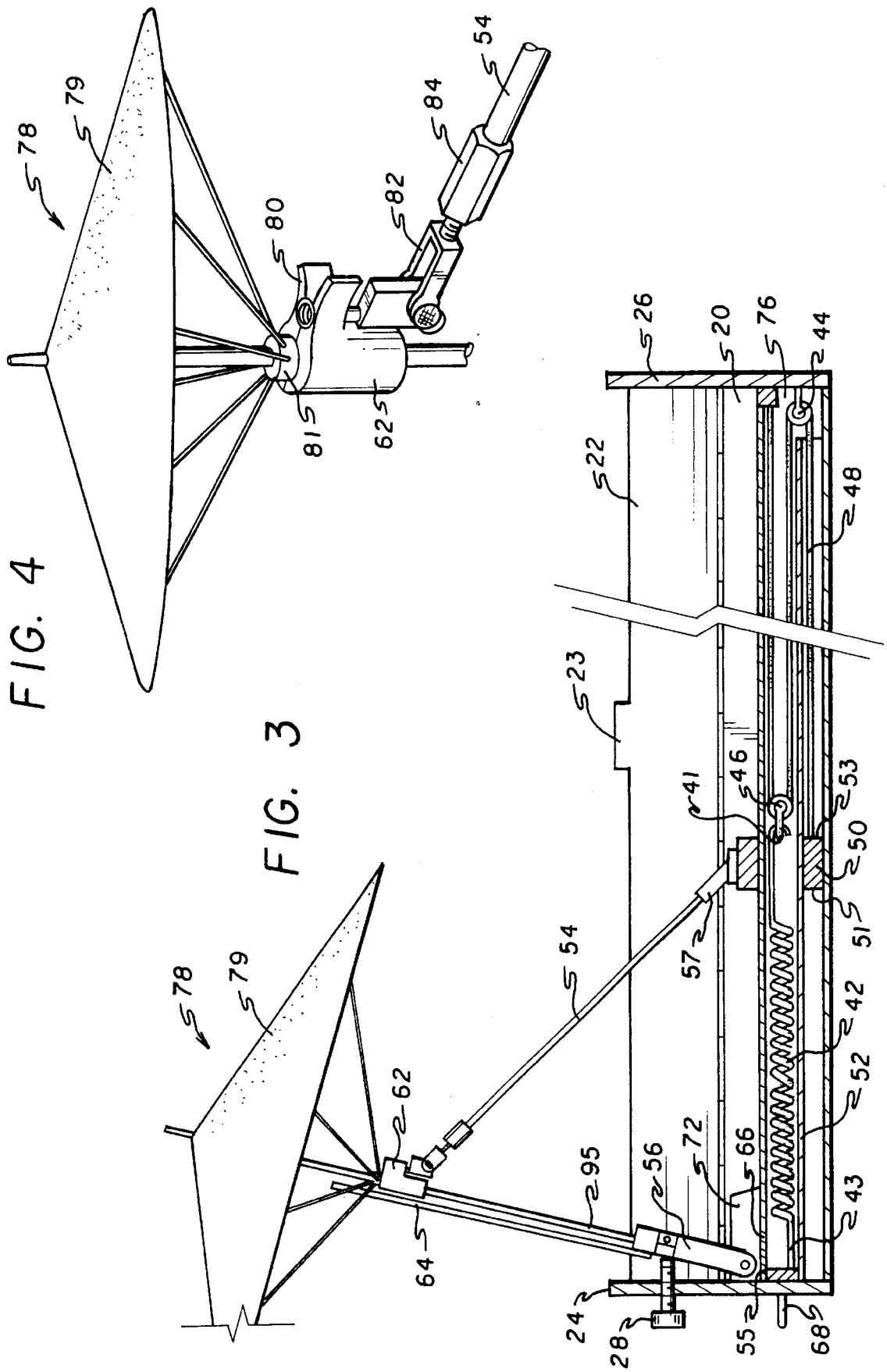

5,529,368

UMBRELLA UNIT ATTACHABLE TO A VEHICLE

BACKGROUND OF THE INVENTION

1. Field of the Invention

The present invention relates generally to protective devices for vehicles and vehicle passengers, and more particularly to shields against rain, for use with vehicles.

2. Description of the Prior Art

As anyone who regularly uses a car can attest, it is frequently necessary to leave a car in inclement weather. If, for example, it is raining out when a passenger needs to leave a car, the passenger must have an umbrella and must go to the trouble of opening it inside the car in order to avoid getting both the passenger and the inside of the car wet from the rain. If the passenger is carrying baggage, matters become all the more complicated. For these reasons, there is a need for an umbrella apparatus for use on a vehicle that will automatically open an umbrella in a desired position outside the car without the hassle associated with manual umbrellas. The umbrella should protect the passengers and vehicle interior from water and be usable separate from the vehicle, so that once the umbrella is deployed, the passenger can simply take the opened umbrella away from the car, to wherever the passenger may be going. Because of the clear need for such an umbrella apparatus, many attempts have been made to fulfill this need, invariably without complete success.

U.S. Pat. No. 2,426,113, issued on Aug. 19, 1947, to Robert E. Northcutt, describes an umbrella holder for use inside a car. This patent does not suggest a self-powered deployment mechanism or storage of an umbrella outside a vehicle.

U.S. Pat. No. 4,543,971, issued on Oct. 1, 1985, to Vladimir Sirota, describes an umbrella holder to be mounted inside an automobile. The holder ejects and retracts the umbrella. The ejection and retraction are powered by a motor that uses electric power which can be depleted. This patent does not suggest use of the holder outside a vehicle.

U.S. Pat. No. 4,562,849, issued on Jan. 7, 1986, to Vladimir Sirota, describes a spring-powered umbrella unit to be mounted externally on a car. The unit deploys an umbrella to protect passengers from rain. Deployment occurs through a complicated, expensive mechanism that is not adapted for use with conventional umbrellas. Moreover, umbrellas in the umbrella unit of this patent cannot readily be separated from the unit for use separate from the car. Thus, in order to be protected from rain, an exiting passenger would have to have an additional, conventional umbrella, thereby obviating any potential advantages of the invention in this patent.

U.S. Pat. No. 4,807,920, issued on Feb. 28 1989, to Hiroyuki Fujiki et al., describes a storage container for an umbrella. The container is integral with the car. The container can eject the umbrella, but such ejection does not deploy the umbrella in an open configuration.

U.S. Pat. No. 5,150,728, issued on Sep. 29, 1992, to Catherine Stark, describes an umbrella having magnetic members for releasably attaching the umbrella to a car. This patent does not provide an umbrella storage container or a deployment mechanism.

U.S. Pat. No. 5,188,331, issued on Feb. 23, 1993, to Gurney D. Baines, describes an umbrella support bracket for use with the trunk of a car. This patent does not show an umbrella deployment mechanism.

U.S. Pat. No. Des. 350,527, issued on Sep. 13, 1994, to Timothy Parlor, Sr., depicts a combined umbrella holder and wind deflector for a vehicle. This patent does not show an umbrella deployment mechanism.

Australian Patent 237718, published on Jan. 14, 1960, issued to George Fritzmeier, on Feb. 22, 1962, describes an umbrella for a tractor that is always in an open configuration. There is no deployment mechanism.

German Patent 35 09 120, issued on Sep. 18, 1986, to Klaus Becher, describes an umbrella having gas compression springs. This patent does not show an umbrella specifically configured for use with a vehicle.

German Patent 42 11 530, issued on Oct. 7, 1993, to Rolf Stemmler, describes an umbrella of up to 500 square meters having a rotation mechanism powered by a motor and alternately by a back-up motor.

Japanese Patent 56-50812, issued on Oct. 2, 1979, to Masao Watanabe, describes an umbrella container housed within a car door. This patent does not show a deployment mechanism, nor suggest storage of an umbrella outside a vehicle.

Great Britain Patent 2 202 141, issued on Sep. 21, 1988, to Joachim Seidel, describes a tilting umbrella frame. There is no suggestion in this patent of using an umbrella with a vehicle.

None of the above inventions and patents, taken either singly or in combination, is seen to describe the instant invention as claimed.

SUMMARY OF THE INVENTION

An umbrella attachable to vehicles has a conventional umbrella and an umbrella-deploying and retracting device which can be attached to a vehicle, thereby protecting passengers and a car's interior from rain. Attachment can occur at a side-door or on a roof of a vehicle. The umbrella-deploying and retracting device has closable doors to protect and conceal the umbrella and umbrella-deploying and retracting device when the umbrella is not in use. The umbrella-deploying and retracting device also has a control mechanism which controls umbrella-deployment and umbrella-retracting via pulleys and a spring. The umbrella can easily be attached to and subsequently separated from the umbrella-deploying and retracting mechanism, as for use separate from the vehicle.

Accordingly, it is a principal object of the invention to provide a shield for preventing rain or other precipitation from contacting vehicle passengers or an interior of a vehicle.

It is another object of the invention to releasably mount an umbrella on a vehicle.

It is a further object of the invention to store an umbrella on a vehicle so that it can be controllably and simply exposed or hidden.

Still another object of the invention is to ensure compatibility with conventional umbrellas.

Still a further object of the invention is to enable an umbrella attached to a vehicle to be easily released for use separate from a vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a side view in a partial cross section of the umbrella unit with an umbrella in an open configuration.

FIG. 4 is a detail perspective view of the umbrella clamping mechanism of the present invention.

DETAILED DESCRIPTION OF THE PREFERRED EMBODIMENTS

Figure 1:
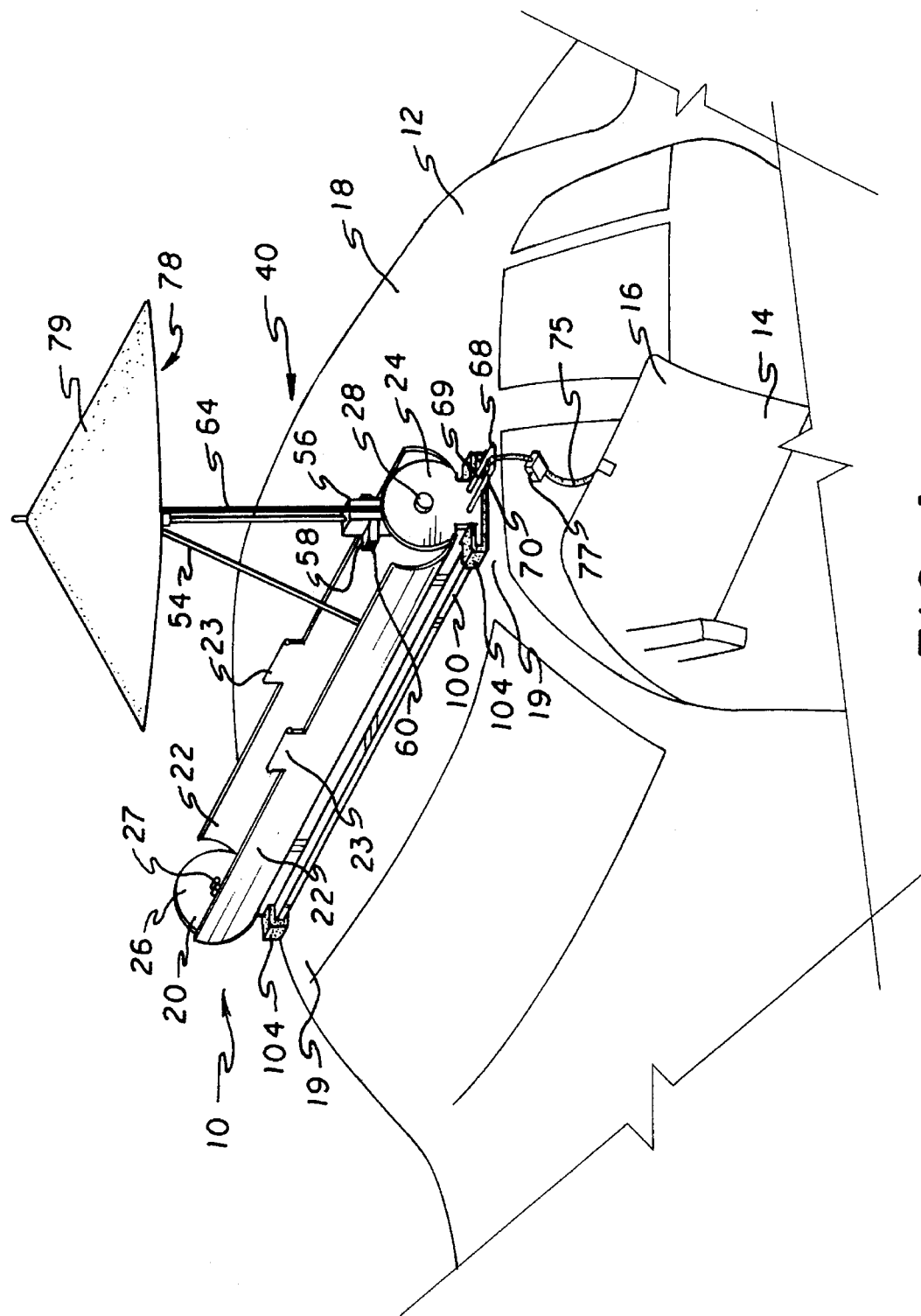
FIG. 1 is an environmental, perspective view of the umbrella unit according to a first embodiment of the present invention including an umbrella in an open configuration, attached to a vehicle's roof.
Figure 2:
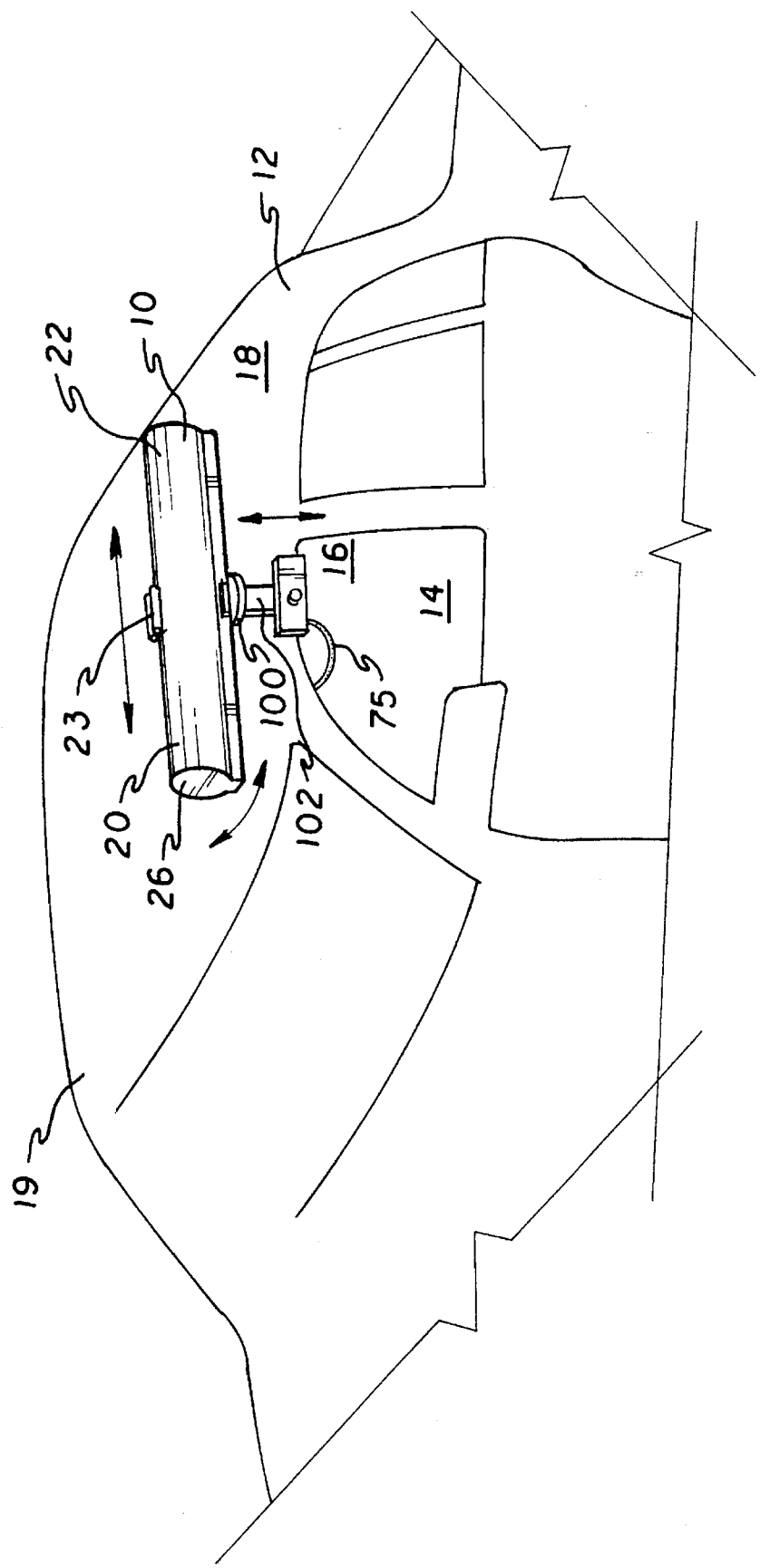
FIG. 2 is an environmental, perspective view of the umbrella unit according to a first embodiment of the present invention shown in a closed configuration, attached to a vehicle's side-door.
Figure 6:
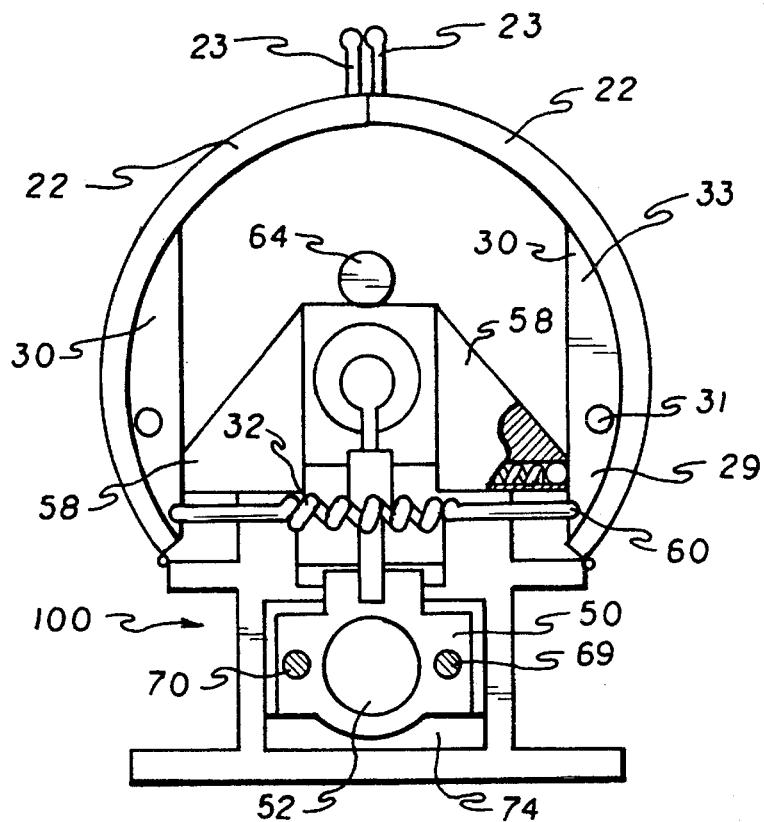
FIG. 6 is an end view with the end plate removed and a partial in cross-section of a door closure of the umbrella unit according to the present invention, shown in a closed configuration Similar reference characters denote corresponding features consistently throughout the attached drawings.
Figure 5:
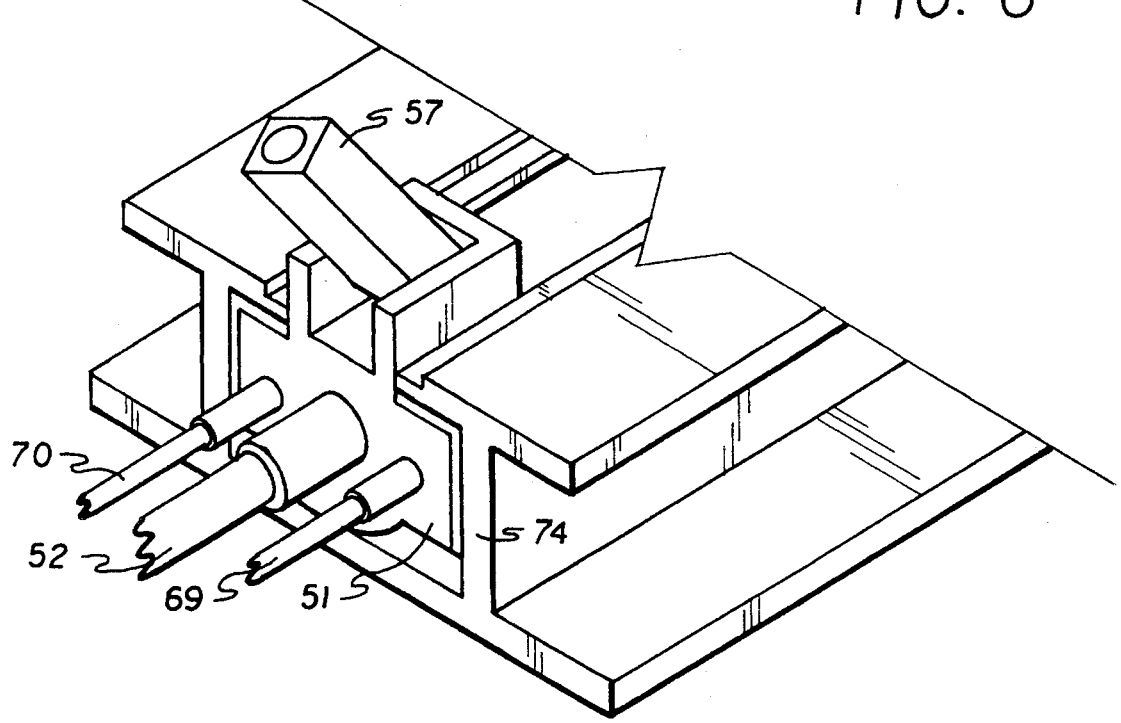
FIG. 5 is a partial detail, cut-away view of the slider and slider channel of the umbrella unit.

There is an almost infinite variety of convenience gadgets available for improving a passenger's comfort during use of the car, yet few are directed to use outside a car for protecting against rain, and none adequately provides a simple way of releasably using a conventional umbrella with an umbrella-deploying and retracting mechanism. The present invention, in contrast to prior art, is mounted externally and automatically deploys and retracts a conventional, releasable umbrella with a simple pull.

Referring to the drawings, an umbrella unit 10 comprises a container portion 20, an umbrella-deploying and retracting mechanism 40, and mounting members 100. The container portion 20 has two doors 22 having handles 23, a front end plate 24, a tilt angle adjustment member 28 projecting through the front end plate 24, a rear end plate 26 having an umbrella tip support 27, two door ribs 30, and a door spring 32.

The umbrella-deploying and retracting mechanism has a main spring 42, a fixed pulley 44 connected to the rear end plate 26, a moving pulley 46, a cable 48, a umbrella supporting slider 50, a sliding tube 52, a supporting lever 54, an umbrella socket 56 having a bi-laterally disposed door closers 58 having closer rollers 60, an umbrella clamp 62, an auxiliary umbrella linkage 64, a fulcrum channel assembly 66, and a flexible U-shaped control strip 68. The fulcrum channel assembly 66 has a fulcrum portion 72 which pivotally receives the umbrella socket 56, and a channel portion 74 which slidingly engages the umbrella supporting slider 50.

The mounting members 100 are different depending on the location on a vehicle 12 to which the umbrella unit 10 is mounted. Preferably, the umbrella unit 10 is mounted on a side-door 14, although this mounting plan is appropriate only for light-weight umbrellas. For side-door mounting, the mounting members 100 comprise a supporting assembly 102 that clamps to a top portion 16 of a side door 14, by known means. The supporting assembly 102 allows adjustment of the position and orientation of the umbrella unit 10 in any of three ways, i.e. vertically, translationally—in a path parallel to a straight path of the vehicle 12—and rotationally, by known means.

Alternately, the umbrella unit 10 can be mounted on a roof 18 of a vehicle 12. In this alternate mounting orientation, which is especially appropriate for use with heavy umbrellas, the mounting members 100 require two end brackets 104, which confine the umbrella unit 10 and attach to opposing sides 19 of the roof 18 of the vehicle 12, by conventional fastening known means. Each bracket 104 simultaneously attaches to the umbrella unit 10, thereby retaining the unit 10 in position on the roof 18 of the vehicle 12.

The control strip 68 of the umbrella-deploying and retracting mechanism 40 has two arms 69, 70 that define the U-shape of the control strip. The two arms 69, 70 project through the front end plate 24 of the container portion 20, and connect to the umbrella supporting slider 50 on a front face 51. On a rear face 53 of the slider 50, the cable 48 is connected to the slider 50 and runs toward the rear end plate 26, around the fixed pulley 44, into the sliding tube 52, back toward the front end plate 24, around the moving pulley 46, and back to the rear end plate 26, where it is permanently attached. The moving pulley 46 is attached to the main spring 42, on a first end 41 of the main spring 42. The main spring 42 is attached to the front end plate 24 at a second end 43 of the main spring 42. Both the main spring 42 and the moving pulley 46 are entirely constrained within the sliding tube 52.

The sliding tube 52 is connected at a first end 55 to the front end plate 24 and at a second end 57 to the rear end plate 26. The sliding tube 52 has an aperture 76 in which the fixed pulley 44 is located and through which the cable 48 passes. The slider 50 slides along the sliding tube 52.

In operation, the umbrella unit 10 is opened by pulling the control strip 68, which effects movement of the slider 50 within the channel portion 74 in the direction of the front end plate 24. In this way, the moving pulley 46 is caused to move in a direction opposite to that of the slider 50, or equivalently, towards the rear end plate 26. Movement of the moving pulley 46 toward the rear end plate 26 brings about extension of the main spring 42. In this way, the slider 50 tends increasingly to resist further movement towards the front end plate 24, and also tends increasingly to experience a returning force toward the rear end plate 26 from the main spring 42 via the cable 48.

In a roof-mounted umbrella unit 10, the pulling of the control strip 68 is preferably accomplished by attachment of a cord 75 between the control strip 68 and a top portion 16 of one of the vehicle's side-doors 14. In a side door-mounted umbrella unit 10, pulling of the control strip is preferably accomplished by attachment by a cord 75 between the control strip 68 and an interior part of the vehicle 12, such as a window visor (not shown). Thus, for either type of mounting, when the side door 14 is opened, the cord 75 pulls on the control strip 68, thereby causing the umbrella unit 10 to deploy an umbrella 78. Preferably, the umbrella 78 is a conventional umbrella designed for holding in a hand. The length of the cord 75 can be adjusted by a buckle 77.

As the control strip 68 is pulled, and as the slider 50 concomitantly moves along the channel portion 74 of the fulcrum channel assembly 66 in the direction of the front end plate 24, a supporting lever socket 57 causes the supporting lever 54 to produce pressure against the umbrella clamp 62. This pressure causes the umbrella 78 to move upward away from the umbrella unit 10. This upward movement of the umbrella 78 causes upward pivoting of the umbrella socket 56, along with upward movement of the door closers 58. Upward movement of the door closers 58 is facilitated by ball-and-spring style rollers 60 within the door closers 58. Upward movement of the door closers 58 releases lower portions 29 of the door ribs 30. Tension in the door spring 32 then causes the lower portions 29 of the door ribs 30 to pivot inwardly around door rib pivots 31. Consequently, upper portions 33 of the door ribs 30 pivot outwardly, thereby opening the container portion 20 of the umbrella unit 10, and allowing further deployment of the umbrella 78.

As the slider 50 moves toward the front end plate 24, the supporting lever 54 exerts force on the umbrella clamp 62. The umbrella clamp 62 is preferably comprised by a spring clamp member 80 with a rotating U-bolt linkage 82 having a tension adjuster 84 connecting the linkage 82 to the supporting lever 54. Preferably, the clamp member 80 is releasable by simple application of finger pressure, i.e., by pinching. The clamp member 80 is typically clamped to an umbrella-canopy supporting-rod bushing portion 81 of the umbrella 78. Thus, pressure from the supporting lever 54 on the clamp 62 not only causes outward movement of the umbrella 78, but also expansion of a canopy 79 of the umbrella 78. Under pressure from the slider 50, the umbrella 78 continues to be deployed and its canopy 79 expanded until the control strip 68 is no longer pulled, or until the umbrella socket 56, in which the umbrella 78 is positioned, is obstructed by the tilt adjustment member 28, whichever happens first. Because the degree of umbrella deployment is affected by the position of tilt adjustment member 28, the deployed orientation of the umbrella 78 can be controlled by adjusting the position of the tilt adjustment member 28. The position of this tilt adjustment member 28 could be varied by screw threading, for example as shown in FIG. 3.

When the umbrella 78 is thus deployed, as in FIG. 1, it protects the vehicle's interior and an exiting or entering passenger. The umbrella 78 can be removed simply by unclamping the umbrella clamp 62 from the umbrella 78 and reclamping the umbrella clamp 62 to the auxiliary umbrella linkage 64. At this point, the umbrella 78 can be used separately from the umbrella unit 10, as when a passenger moves away from the vehicle 12, thereby continuously protecting the passenger from the ill-effects of inclement weather.

If desired, the umbrella 78 can be re-inserted into the umbrella unit 10, by placement of a first end 95 of the umbrella 78 in the umbrella socket 56, removal of the auxiliary umbrella linkage 64 from the clamp 62, and replacement of the clamp 62 on the umbrella 78. Regardless of whether the umbrella 78 or the auxilliary linkage 64 is held by the clamp 62, the umbrella unit 10 can be closed merely by release of the control strip 68, such as by closing the vehicle's 12 side door 14, thereby relaxing tension on the cord 75. The main spring 42 automatically causes the slider 50 to move toward the rear end plate 26. In this way, the support lever 54 moves inward into the umbrella unit, and the umbrella 78 or auxiliary linkage 64 (whichever is in the clamp 62) follow the support lever 54 into the umbrella unit 10, and rests on the umbrella tip support 27. The umbrella 78 or auxilliary linkage 64 is thus retracted and enveloped by the container portion 20. As the umbrella 78 or the linkage 64 moves downward, the umbrella socket 56 is forced to pivot downward. The door closers 58 on the umbrella socket 56 engage the door ribs 30 and cause the lower portions 29 of the door ribs 30 to move apart, against the force of the door spring 32. In this way, the doors 22 are closed, concealing the umbrella 78 or the auxiliary linkage 64 and protecting the umbrella unit 10.

The relative simplicity of the umbrella unit's construction and operation ensure that is less expensive and easier to operate than prior inventions. Moreover, the umbrella unit can be used with conventional umbrellas that are inexpensive and commonly available. During use of the umbrella unit, the umbrella can easily be attached, or reattached, for use separate from, or in conjunction with, the umbrella unit. All the while, a user will be protected from inclement weather, without the complexity, ineffectiveness and hassle of using a conventional umbrella alone.

It is to be understood that the present invention is not limited to the embodiments described above, but encompasses any and all embodiments within the scope of the following claims.

We claim:

1. An umbrella unit attachable to a vehicle comprising:

an umbrella;

a means for deploying and retracting said umbrella, including a control strip, whereby the pulling of said control strip causes said umbrella to deploy, and the release of said control strip retracts said umbrella;

a container portion having an exterior and at least one door, said container portion being dimensioned and configured to contain said umbrella and said means for deploying and retracting said umbrella;

said at least one door of said container portion opening when said control strip deploys said umbrella and said at least one door closing when said control strip retracts said umbrella; and mounting members provided on said exterior of said container portion, whereby said container portion is mounted on a vehicle.

2. The umbrella unit according to claim 1, wherein said means for deploying and retracting the umbrella includes a clamp, whereby said umbrella is releasably held.

3. The umbrella unit according to claim 2, wherein said clamp is a spring clamp.

4. The umbrella unit according to claim 1, further comprising:

an umbrella socket having laterally disposed projections; and ribs disposed in said doors; and said projections selectively engaging and disengaging from said ribs; whereby when said projections engage said ribs, said projections force said doors into a closed configuration.

5. The umbrella unit according to claim 4, wherein said projections have rollers to facilitate said engagement.

6. The umbrella unit according to claim 5, wherein said rollers comprise ball-and-spring type rollers.

7. The umbrella unit according to claim 1, further comprising:

an umbrella socket having laterally disposed projections;

a door spring connecting said doors, said door spring dimensioned and configured so as to tend to close said doors; and ribs disposed in said doors;

said projections selectively engaging and disengaging from said ribs; whereby when said projections disengage from said ribs, said door spring forces said doors into an open configuration.

8. The umbrella unit according to claim 1, wherein said container portion has a support member disposed on one end of said container portion, said support member being dimensioned and configured to support said umbrella when said umbrella is contained within said container portion.

9. The umbrella unit according to claim 8, wherein said support member supports a tip of said umbrella.

10. An umbrella unit attachable to a vehicle comprising:
   an umbrella;
   a means for deploying and retracting said umbrella;
   a container portion having an exterior, said container portion being dimensioned and configured to contain said umbrella and said means for deploying and retracting said umbrella;
   said container portion further including an elongated, adjustable tilt adjustment member projecting through said container portion and partially blocking deployment of said umbrella, thereby setting an angle at which said umbrella is deployed; and
   mounting members provided on said exterior of said container portion, whereby said container portion is mounted on a vehicle.

11. The umbrella unit according to claim 10, wherein
   said tilt adjustment member is engaged with said container portion by screw-threads; and
   said tilt adjustment member is adjusted by turning said tilt adjustment member.

12. The umbrella unit according to claim 1, wherein said means for deploying and retracting said umbrella comprises:
   a channel;
   a supporting slider dimensioned and configured to slidingly engage said channel;
   a lever connecting said umbrella and said supporting slider; whereby
   when said supporting slider is slid within said channel, said lever causes said umbrella selectively to deploy from said container portion and to be withdrawn into said container portion.

13. The umbrella unit according to claim 12, further including:
   a main spring having tension tending to pull said supporting slider in a first direction; and
   said control strip that, when pulled by a user, tends to pull said supporting slider in a second direction, opposite to said first direction; whereby
   sliding of said supporting slider is controlled by pulling of said control strip and tension in said main spring.

14. The umbrella unit according to claim 13, further including:
   a cable attached at a first end to said container portion and attached at a second end to said supporting slider;
   a moving pulley attached to a free end of said main spring; and
   a fixed pully attached to said container portion; whereby
   said cable engages said fixed pulley and said moving pulley causing said moving pulley to move toward said fixed pulley when said pulling of said strip pulls said supporting slider in said channel.

15. The umbrella unit according to claim 13, further including a cord attached to said control strip at a first end and attached to a part of a vehicle at a second end, whereby by opening of a door of the vehicle results in pulling of said control strip via said cord.

16. The umbrella unit according to claim 15, further including a means for selectively lengthening and shortening said cord.

17. The umbrella unit according to claim 16, wherein said means for selectively lengthening and shortening said cord is a buckle.

18. The umbrella unit according to claim 1, wherein said mounting members comprise end brackets for mounting said container portion on a roof of the vehicle.

19. An umbrella unit attachable to a vehicle comprising:
   an umbrella;
   a means for deploying and retracting said umbrella;
   a container portion having an exterior, said container portion being dimensioned and configured to contain said umbrella and said means for deploying and retracting said umbrella; and
   mounting members provided on said exterior of said container portion, whereby said container portion is mounted on a vehicle, said mounting members including:
      a mounting clamp dimensioned and configured to clamp onto a side door of the vehicle; and
      a supporting assembly adjustable in position and orientation, said supporting assembly connecting said mounting clamp to said container portion.

20. The umbrella unit according to claim 19, wherein said means for deploying and retracting the umbrella includes a clamp, whereby said umbrella is releasably held.

* * * * *